(12) United States Patent
Reubens et al.

(10) Patent No.: US 11,406,058 B2
(45) Date of Patent: Aug. 9, 2022

(54) CUTTER BAR SUPPORT LINKAGE

(71) Applicant: CNH Industrial America LLC, New Holland, PA (US)

(72) Inventors: Sam Reubens, Sint-Michiels (BE); Glenn Aesaert, Izegem (BE); Bart M. A. Missotten, Herent (BE); Pieter Van Overschelde, Sint-Andries (BE); Herbert M. Farley, Elizabethtown, PA (US); Benjamin Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 356 days.

(21) Appl. No.: 16/663,998

(22) Filed: Oct. 25, 2019

(65) Prior Publication Data

US 2021/0120734 A1 Apr. 29, 2021

(51) Int. Cl.
*A01D 34/28* (2006.01)
*A01D 34/04* (2006.01)
*A01D 34/13* (2006.01)

(52) U.S. Cl.
CPC .......... *A01D 34/28* (2013.01); *A01D 34/046* (2013.01); *A01D 34/13* (2013.01)

(58) Field of Classification Search
CPC ....... A01D 34/28; A01D 34/046; A01D 34/13
See application file for complete search history.

(56) References Cited

U.S. PATENT DOCUMENTS

| | | |
|---|---|---|
| 2,807,127 A | 9/1957 | Scheidenhelm |
| 3,142,375 A | 7/1964 | Luke |
| 3,982,383 A | 9/1976 | Mott |
| 4,441,307 A | 4/1984 | Enzmann |
| 4,742,671 A | 5/1988 | Bich |
| 5,157,905 A | 10/1992 | Talbot et al. |
| 6,250,055 B1 | 6/2001 | Franet |
| 7,802,417 B2 | 9/2010 | Sauerwein et al. |
| 8,051,633 B2 | 11/2011 | Figgins et al. |
| 10,299,434 B2 * | 5/2019 | Yanke .................... A01D 57/04 |

(Continued)

FOREIGN PATENT DOCUMENTS

| | | |
|---|---|---|
| DE | 3829789 A1 | 3/1990 |
| DE | 9117195 U1 | 2/1997 |

(Continued)

OTHER PUBLICATIONS

European Search Report for European Application No. 18196312.5, dated Feb. 28, 2019, 8 pages.

(Continued)

*Primary Examiner* — Abigail A Risic (74) *Attorney, Agent, or Firm* — Peter Zacharias; Patrick Sheldrake (57) ABSTRACT

An agricultural vehicle header having a frame having a main truss extending in a lateral direction, at least one support arm extending from the frame in the forward direction, a cutter assembly attached to a respective distal end of each at least one support arm, and a linkage connecting a respective proximal end of each at least one support arm to the frame. The linkage includes a virtual pivot located below the main truss, and at or behind the main truss with respect to the forward direction. An agricultural vehicle having the header is also provided.

22 Claims, 4 Drawing Sheets

(56) References Cited

U.S. PATENT DOCUMENTS

| | | | |
|---|---|---|---|
| 11,032,970 B2* | 6/2021 | Brimeyer | ................ F16H 21/44 |
| 2003/0074876 A1 | 4/2003 | Patterson et al. | |
| 2009/0277147 A1* | 11/2009 | Honas | .................... A01D 57/20 |
| | | | 56/208 |
| 2014/0041352 A1 | 2/2014 | Johnson | |
| 2017/0311545 A1 | 11/2017 | Walter | |
| 2018/0279549 A1 | 10/2018 | Lacy et al. | |
| 2019/0098831 A1 | 4/2019 | Yanke et al. | |
| 2021/0112713 A1* | 4/2021 | Martin | ................ A01B 63/002 |
| 2021/0112715 A1* | 4/2021 | Ricketts | ................ A01D 43/06 |

FOREIGN PATENT DOCUMENTS

| | | |
|---|---|---|
| DE | 9117195 U1 | 3/1997 |
| EP | 2374344 A2 | 10/2011 |
| EP | 3610716 A1 | 2/2020 |
| GB | 1208285 | 10/1970 |
| WO | 9112709 A1 | 9/1991 |
| WO | 02102138 A1 | 12/2002 |

OTHER PUBLICATIONS

Extended European Search Report for EP Application No. 20203966.5 dated Mar. 1, 2021 (six pages).

\* cited by examiner

CUTTER BAR SUPPORT LINKAGE

BACKGROUND OF THE INVENTION

Agricultural equipment, such as combines, swathers and windrowers, typically include a header that is movably attached to the chassis of the vehicle. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

During operation, the header might be raised or lowered to account for variations in the ground level, properties of the particular crop being harvested, and various other operating conditions. Thus, a typical header might be pivotally mounted to the vehicle chassis by way of a feeder housing that can be moved up and down to raise and lower the entire header. The header also may include a forward tilt adjustment mechanism that rotates the entire header forward and backward to change the angle of the header relative to the ground. Still further, the header might have a lateral tilt adjustment mechanism to rotate the header about the fore-aft axis to account for different ground levels in the lateral direction.

Such adjustments are useful for gross placement of the header, but often are not sufficient to maintain the cutter bar at a uniform height over continuously varying terrain. Thus, the cutter bar may be mounted on a movable support to move somewhat independently of the rest of the header. Still further the cutter bar may comprises a flexible cutter bar that is supported by multiple independently-movable supports along the lateral extent of the cutter bar. Thus, a flexible cutter bar can conform to lateral undulations in the terrain better than a rigid cutter bar.

Various flexible cutter bar support systems are known in the art. For example, the cutter bar may be mounted on support arms that are mounted on the header frame by a simple pivot connection. A problem with such mechanisms is that the pivot is located above the ground level, and usually above the level of the cutter bar. Thus, when the cutter bar strikes an object while moving forward, the object can generate a rearward force acting below the pivot, which creates a moment force that tends to drive the cutter bar into the ground.

As another example, U.S. Patent Pub. No. 2019/0098831 describes a cutter bar that is mounted on a linkage comprising uneven-length arms or on a semi-circular track, so as to pivot about a virtual point located below the cutter bar. This configuration is described as being operable to raise the cutter bar when it strikes an object. However, the cutter bar and linkage are mounted on stub arms that extend forward of the header frame, and a rearward force generated by contact with an object can still tend to pull the entire assembly (stub arm, linkage and cutter bar) downwards, even while the cutter bar rises relative to the stub arm. Furthermore, the forward link pivots (136 and 138) are oriented on a line that is at a large obtuse angle relative to the two pivot connections on the cutter bar (136 and 142), and so relatively little motion is required to align these three pivots (138, 136, 142), at which point the virtual pivot will be located at the lowest pivot (142). Thus, the virtual pivot location is prone to rapidly move to a location above the underlying ground as the cutter bar rises.

Thus, the state of the art still requires development.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle header having a frame having a main truss extending in a lateral direction, at least one support arm extending from the frame in the forward direction, a cutter assembly attached to a respective distal end of each at least one support arm, and a linkage connecting a respective proximal end of each at least one support arm to the frame. The linkage has a virtual pivot located below the main truss, and at or behind the main truss with respect to the forward direction.

In some exemplary aspects, the linkage includes a front link extending in a first direction from a proximal front pivot on the frame to a distal front pivot on the support arm, a rear link extending in a second direction from a proximal rear pivot on the frame to a distal rear pivot on the support arm, and the first direction and the second direction intersect at a location below the linkage. When the cutter assembly is located in an operative position with respect to an underlying horizontal surface, the first direction and the second direction may intersect at a location below the underlying horizontal surface. The proximal rear pivot may be located behind the main truss with respect to the forward direction. The proximal rear pivot may be located on a rear side of the main truss, and the proximal front pivot may be located on a front side of the main truss. The proximal front pivot may be located behind the main truss with respect to the forward direction.

In some exemplary aspects, a suspension may be located between the front link and the rear link. The suspension may have one or more mechanical or pneumatic springs, or hydraulic actuators. The hydraulic actuator may have a first end connected to the proximal front pivot and a second end connected to the distal rear pivot, or a first end connected to the distal front pivot and a second end connected to the proximal rear pivot.

In some exemplary aspects, when the cutter assembly is located in an operative position with respect to an underlying horizontal surface, the distal front pivot and the distal rear pivot may be located on a first line extending at 30 degrees or less relative to the underlying horizontal surface. The proximal front pivot and the distal front pivot may be located on a second line extending at 60 degrees or more relative to the underlying horizontal surface. The proximal rear pivot and the distal rear pivot may be located on a third line extending at 60 degrees or more relative to the underlying horizontal surface.

In some exemplary aspects, when the cutter assembly is located in an operative position with respect to an underlying horizontal surface, the distal front pivot and the distal rear pivot may be located on a first line, the distal front pivot and the proximal front pivot may be located on a second line oriented at less than 135 degrees to the first line, and the distal rear pivot and the proximal rear pivot may be located on a third line oriented at less than 135 degrees to the first line.

In some exemplary aspects, when the cutter assembly is located in an operative position with respect to an underlying horizontal surface, the proximal front pivot may be located in front of the distal front pivot with respect to the forward direction, and the proximal rear pivot may be located behind the distal rear pivot with respect to the forward direction.

In some exemplary aspects, the proximal front pivot may be located below the distal front pivot, and the proximal rear pivot may be located below the distal rear pivot.

In some exemplary aspects, the proximal front pivot may be located below the distal front pivot and the proximal rear pivot may be located above the distal rear pivot, or the proximal front pivot may be located above the distal front pivot and the proximal rear pivot may be located below the distal rear pivot.

In some exemplary aspects, linkage may include one or more tracks on one of the frame and the support arm, and one or more followers configured to slide in the one or more tracks on the other of the frame and the support arm.

In some exemplary aspects, the linkage may include a link extending from a proximal pivot at the frame to a distal pivot at the support arm, a cam located on one of the frame and the support arm, and a cam follower located on the other of the frame and the support arm.

In some exemplary aspects, a lateral conveyor may be located above the at least one support arm, and a backsheet may be located at a rear edge of the lateral conveyor and attached to the frame in front of the main truss.

In another exemplary aspect, there is provided an agricultural vehicle having a chassis configured for movement on a surface, and a header attached to the chassis. The header has a frame having a main truss extending in a lateral direction, at least one support arm extending from the frame in the forward direction, a cutter assembly attached to a respective distal end of each at least one support arm, and a linkage connecting a respective proximal end of each at least one support arm to the frame. The linkage has a virtual pivot located below the main truss, and at or behind the main truss with respect to the forward direction.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide cutter bar and draper support assemblies for headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
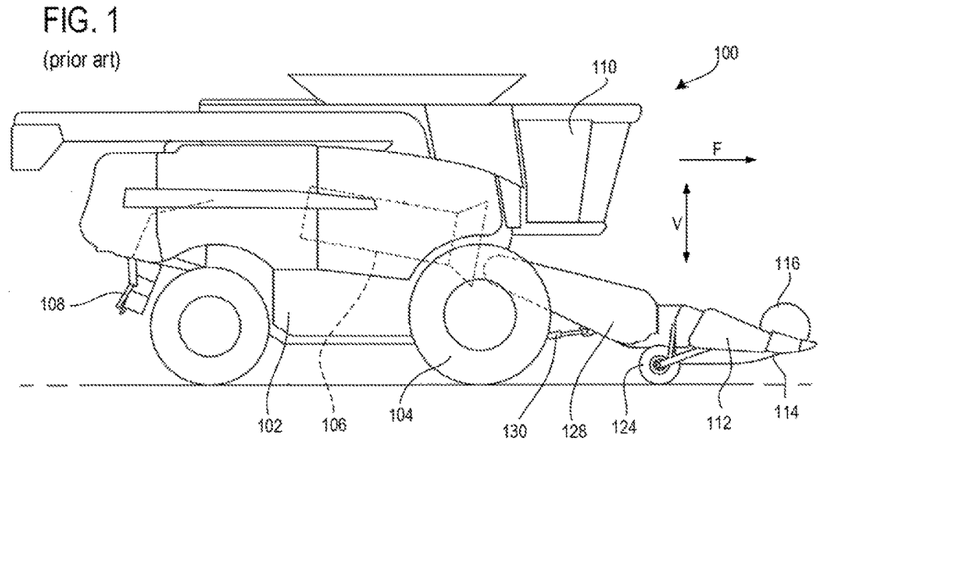
FIG. 1 is a side view of a prior art agricultural combine.

FIG. 1 illustrates an example of a prior art agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
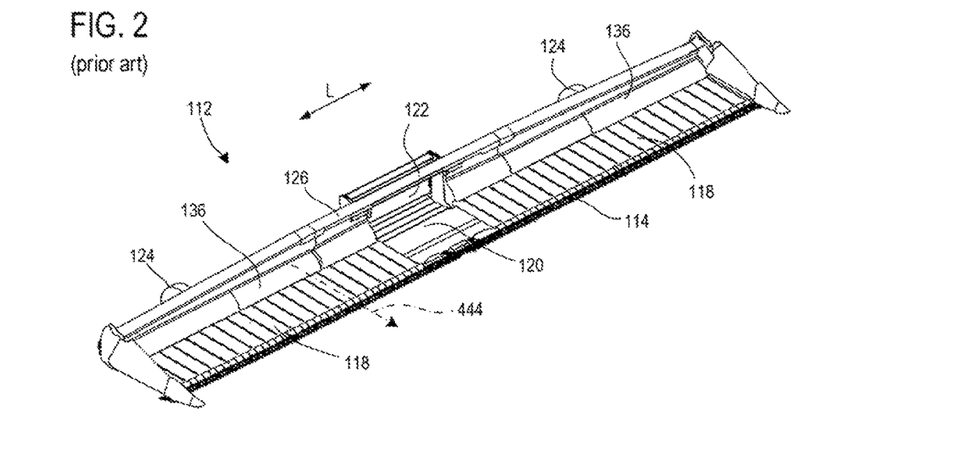
FIG. 2 is an isometric view of a prior art header.
Figure 3:
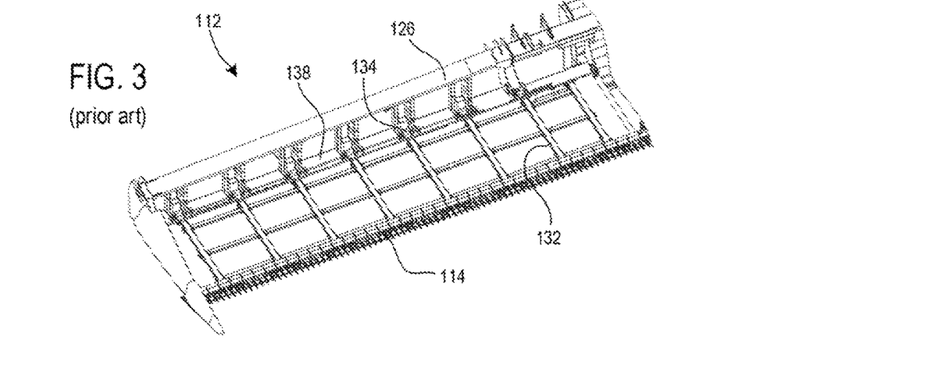
FIG. 3 is an isometric view of a portion of a prior art header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more feeder housing actuators 130 to raise and lower the header 112 in a vertical direction V relative to the ground.

The illustrated exemplary header 112 is a unitary header having a single frame that extends continuously between the ends of the header 112 in the lateral direction L. In other embodiments, the header 112 may comprise a multi-segment or articulated header having a center section and one of more wing sections movably attached to the lateral end of the center section by pivots or linkages. In either case, the header 112 has a central region defined by the lateral extent of the crop outlet, and lateral regions extending in the lateral direction L from the central region.

The header 112 also includes a number of support arms 132 that extend forward from the frame 126 to hold parts such as the cutter bar 114, conveyors 118, or the like. The support arms 132 may be rigidly attached to the header 112, or attached by movable mounts, such as pivots or linkages. In the case of movable support arms 132, a suspension may be used to control the motion of the support arms 132. For example, each support 132 may have its own spring and/or damper system, which is intended to allow the support arms 132 to move up and down individually or in groups to follow local undulations along the lateral direction L. As another example, each support arm 132 may be mounted by a flexible mount such as a torsion link 134 as described in U.S. Pat. No. 8,051,633, which is incorporated herein by reference. Skids, gauge wheels or other ground supports may be located below the support arms 132 to generate a lifting force via contact with the ground. The positions of the ground supports and the spring and damping properties of the movable connections may be adjustable to tailor the header 112 for use in particular operating conditions. In addition, the positions of the support arms 132, such as their angular orientation (downward tilt) relative to the frame 126 may be adjustable.

In use, the header 112 cuts crop materials with the cutter bar 118, receives the crop materials on the conveyors 118, 120, and conveys the crop materials back through the crop outlet 122 to the threshing and separating system 106. The movement of the crop materials in the lateral regions of the header 112 is controlled, in part, by one or more backsheets 136. The backsheets 136 are located in the lateral regions of the header, at rear edges of the lateral conveyors 118, and prevent crop materials from falling behind the lateral conveyors 118. The backsheets 136 may slope backwards, as shown in FIG. 2, or they may be vertical or have other profiles.

In the example of FIG. 3, it can be seen that the support arms 132 extend forward from a main truss 138 of the header frame 126. The main truss 138 is located at a lower end of the frame 126, and extends in the lateral direction L. Thus, the main truss 138 acts as the structural backbone of the frame in holding the support arms 132. Each support arm 132 is pivotally connected to the header frame 112 at a respective pivot 140. In use, the pivots 140 are located above the cutter bar 114. Thus, a backwards force on the cutter bar 114 caused by striking an object results in a moment force about the pivot 140 causing the support arm 132 to rotate downwards relative to the frame 112. Such "diving" can tend to drive the cutter bar 114 into the object or the ground, potentially leading to damage and down time.

The problem of the cutter bar diving into the ground can be addressed by mounting the cutter bar on a linkage that pivots about a point located below the point of contact with the object, such as at or below the ground level. As noted above, previous attempts to provide such a configuration have yielded designs that are not ideal. It is believed that issues of previous efforts can be mitigated or cured by making various different modifications, such as those discussed herein, which may be used individually or collectively to provide an improved system for mounting the cutter bar.

Figure 4:
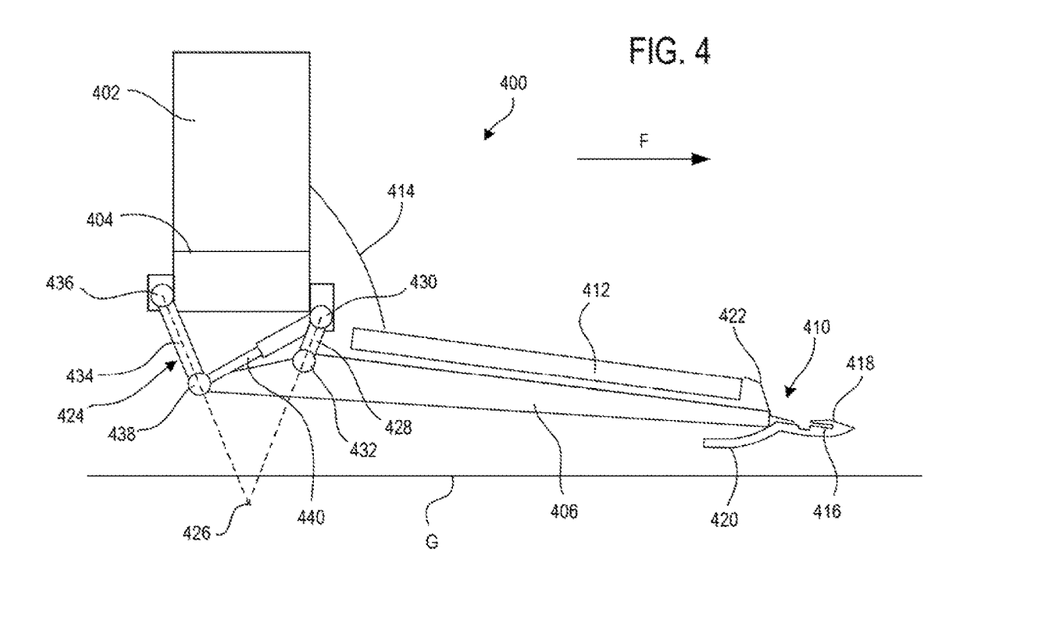
FIG. 4 is a side view of a header illustrating an exemplary embodiment of a cutter bar support linkage.

Referring now to FIG. 4, a first example of an improved cutter bar support linkage is shown. FIG. 4 shows a combine header 400 having a frame 402 with laterally-extending main truss 404 located at or near the bottom of the frame 402. A plurality of support arms 406 extend in the forward direction from the frame 402, and the distal ends of the support arms 406 are connected to a cutter assembly 410. FIG. 4 shows a single support arm 406, but it will be appreciated that multiple identical or similar arms may be located at spaced locations along the lateral direction L, such as shown in FIG. 3. The support arm 406 may also support one or more rollers or other supports to hold a belt 412. A backsheet 414 may be mounted to the frame 402 in front of the main truss 404 and at a location to block crop materials from passing beyond the rear edge of the belt 412. In this example, the proximal end of the support arm 406 is rigidly connected to the frame 402 by welds, fasteners, or the like. The cutter assembly 410 includes a cutter bar 416, and may include other conventional features such as blade guards 418, a skid shoe 420, and a crop guide plate 422. Cutter assemblies are well known in the art, and need not be described in detail herein.

A linkage 424 connects the proximal end of each support arm 406 to the frame 402. The linkage 424 is configured with a virtual pivot 426 located below the main truss 404, and preferably below the level of the ground located below the header 400. The virtual pivot 426 is also located at or behind the main truss 404 with respect to the forward direction F. This configuration is expected to provide various benefits, such as reducing deflection of the frame 402 when the cutter bar 416 encounters an obstacle, and minimizing the additional reinforcement necessary (if any) to connect the linkage 424 to the frame 402. This configuration also may be helpful to obtain a more linear motion of the cutter assembly 410 during deflections or height adjustment, thereby reducing the need to ensure that the crop materials can flow freely to the belt 412.

The linkage 424 may be configured as a four-bar linkage. For example, the linkage 424 may comprise a front link 428 extending in a first direction from a proximal front pivot 430 on the frame 402 to a distal front pivot 432 on the support arm 406, and a rear link 434 extending in a second direction from a proximal rear pivot 436 on the frame 406 to a distal rear pivot 438 on the support arm 406. The first direction and the second direction are oriented to intersect at a location below the linkage to form the virtual pivot 426. More specifically, when the header 402 and cutter assembly 410 are located in an operative position on the underlying ground or other horizontal surface, the first direction and second direction intersect at a location below the main truss 404, and more preferably below the underlying surface G. As the linkage 424 moves, the location of the virtual pivot 426 will continuously move, but preferably remains below the level of the frame 402, and more preferably remains below the level of the underlying surface G throughout most or all of the support arm's range of motion during normal use.

In the embodiment of FIG. 4, the proximal rear pivot 436 is located behind the frame 402, while the proximal front pivot 430 is located in front of the frame 402. Thus, the linkage 424 straddles the frame 402, and forces generated at the proximal front pivot 430 and proximal rear pivot 436 will be carried more directly by the frame 402. This is expected to reduce or minimize deflection of the frame and any components used to mount the linkage 424. In addition, the proximal rear pivot 436 and proximal front pivot 430 may be connected to the main truss 404, such as by being mounted by pins or screws to holes through the main truss 404, or on mounting bosses extending from the main truss 404. This is expected to minimize the need to add reinforcing structures to support the connections to hold the linkage 424.

A suspension may be provided to control the position of the linkage 424. For example, a hydraulic actuator 440 may be connected between the frame 402 and the linkage 424 or support arm 406. The hydraulic actuator 440 may be a conventional telescoping piston and cylinder arrangement, in which pressurized hydraulic fluid is use to control the state of extension of the piston relative to the cylinder. The hydraulic actuator 440 may be a double-acting actuator, in which force can be applied by the hydraulic fluid to move the piston in either direction. Alternatively, the hydraulic actuator 440 may be a single-acting actuator, in which force can be applied by the hydraulic fluid only to move the piston in one direction while motion in the opposite direction is caused by gravity, a return spring, or the like. The hydraulic actuator 440 also may be configured to allow the linkage 424 to move or "float" when external forces are applied to the support arm 406, as known in the art. The hydraulic actuator 440 (or other suspension mechanisms) may be adjustable to optimize performance in various conditions, and to adjust the starting or rest position of the components.

The suspension may be located at any suitable location, but in a preferred embodiment it is located within the general confines of the linkage 424 itself to provide a more compact assembly. For example, the hydraulic actuator 440 may be located between the front link 428 and the rear link 434. The ends of the hydraulic actuator 440 may be connected to the links 428, 432, to the frame 402 (e.g., at the main truss 404 or elsewhere), or to the support arm 406. In the shown example, one end of the actuator 440 is connected to the proximal front pivot 430, and the other end of the actuator 440 is connected to the distal rear pivot 438. This configuration minimizes the number of fasteners and complexity of the system because the ends of the actuator 440 may be connected on the same pins or bolts that form the pivots. This configuration also eliminates bending loads that would be present if the ends of the actuators were mounted somewhere other than on the linkage pivots.

Figure 5:
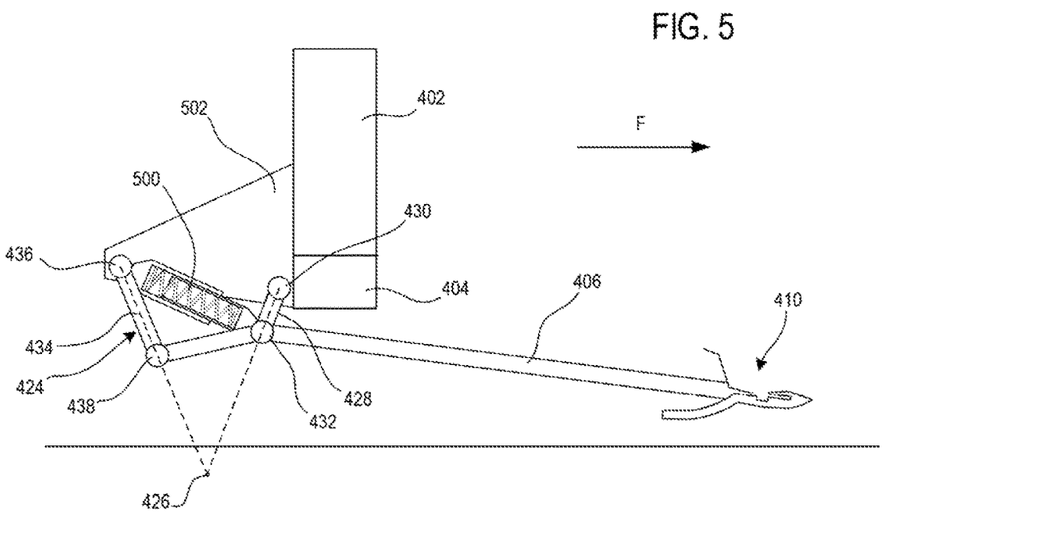
FIG. 5 is a side view of a header illustrating another exemplary embodiment of a cutter bar support linkage.

FIG. 5 shows an alternative embodiment in which a suspension in the form of a mechanical spring 500, such as a coil spring, is located within the linkage 424. In this case, the spring 500 may be mounted inside telescoping chambers that contain the spring 500 and protect it from the elements, but this is not required in all embodiments. FIG. 5 also shows the suspension having a first end connected to the proximal rear pivot 436, and the second end connected to the distal front pivot 432.

FIG. 5 also shows the entire linkage 424 being located behind the main truss 404, which may be accomplished by mounting the linkage 424 to a rearward-extending flange 502 or other support structure. This configuration is expected to provide additional space for the linkage 424 in those cases in which the frame 402 or the main truss 404 might be relatively close to the ground, or if other operative components occupy the lower part of the frame 402. This configuration also may be useful to facilitate service, adjustment, installation and removal of the support arms 406.

It is expected that the geometry of the four-bar linkage may be configured to provide certain benefits. For example, as explained above, when two adjacent arms of a four-bar linkage become aligned with each other (i.e., their pivots are arranged in a straight line), the virtual pivot location moves to be coincident with one of the end pivots. Thus, the virtual pivot is no longer spaced from the linkage. In the context of a cutter bar support linkage, this means the virtual pivot will move upwards to be at the level of the linkage. Furthermore, if the linkage moves far enough to inflect, the virtual pivot may move above the linkage.

Figure 6:
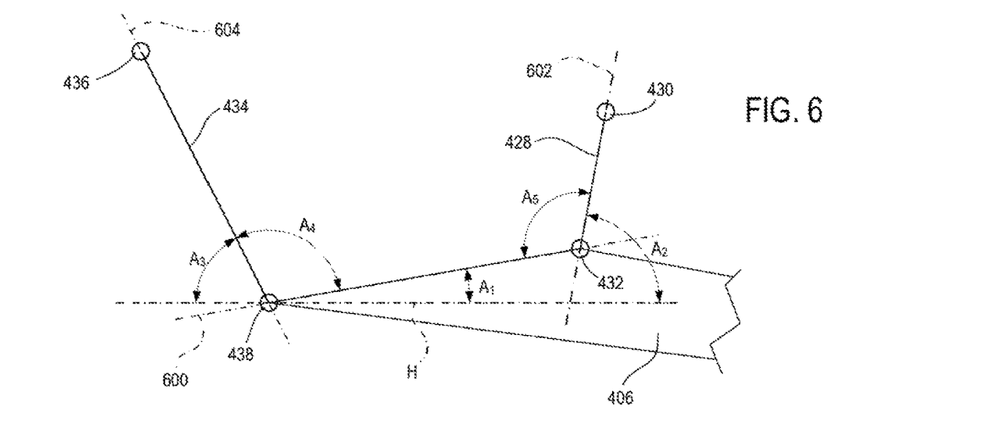
FIG. 6 is a schematic diagram of another exemplary embodiment of a cutter bar support linkage.

To avoid this, the geometry of the linkage is selected to allow a suitable range of motion for the cutter assembly 410, while still maintaining a desirable virtual pivot location below the linkage 424, and more preferably below the ground level. For example, FIG. 6 shows the linkage 424 when the header 400, support arm 406 and cutter assembly 410 are located in an operative position with respect to the underlying horizontal surface. In this case, the linkage 424 is configured with the distal front pivot 432 and the distal rear pivot 438 on a first line 600 extending at an angle $A_1$ of 30 degrees or less relative to the underlying horizontal surface (line H represents a line parallel to the underlying horizontal surface). In addition, the proximal front pivot 430 and the distal front pivot 432 are located on a second line 602 extending at an angle $A_2$ of 60 degrees or more relative to the underlying horizontal surface. Similarly, the proximal rear pivot 436 and distal rear pivot 438 are located on a third line 604 extending at an angle $A_3$ of 60 degrees or more relative to the underlying horizontal surface. The foregoing angle measurements are absolute values on a scale of 0 to 90 (e.g., a line lying at 110 degrees from horizontal as measured in one direction and 70 degrees from horizontal as measured in the opposite direction would be considered an 70 degree angle).

The linkage 424 also may be configured with certain maximum included angles between the links 428, 434 when the linkage 424 is placed in its initial configuration for harvesting operations. For example, in the embodiment of FIG. 6, the second line 602 may be oriented at a first included angle A4 of less than 135 degrees to the first line 600, and the third line 604 may be oriented at a second included angle A5 of less than 135 degrees to the first line 600. During operation, these angles A4, A5 preferably do not change by more than about 30 degrees, to help ensure continuous positioning of the virtual pivot below the linkage 434, and more preferably below the ground level.

The selection of the starting orientation of the links 428, 434 also may affect the operation of the cutter bar support linkage. For example, as shown in FIG. 6, the front link is arranged with the proximal front pivot 430 in front of the distal front pivot 432 with respect to the forward direction. This configuration causes the distal front pivot 432 to operate only in a lifting mode (i.e., the distal front pivot 432 only moves upwards) when the support arm 406 contacts an object. Similarly, the distal rear pivot 438 may be located in front of the proximal rear pivot 436 relative to the forward direction to operate in a continuous dropping mode. This may be helpful to improve the dynamic response of the support arm 406 and cutter assembly 410 by helping to ensure that the center of mass of the assembly moves along a more regular path, rather than being forced to change directions as might happen if the distal front pivot 432 or distal rear pivot 438 transitions between downward and upwards motion.

It will also be appreciated that the links forming the linkage may be bent to help fit within the particular confines of the installation location. For example, one or both of the links 428, 434 may be bent around intermediate objects.

Figures 7, 8, 9:
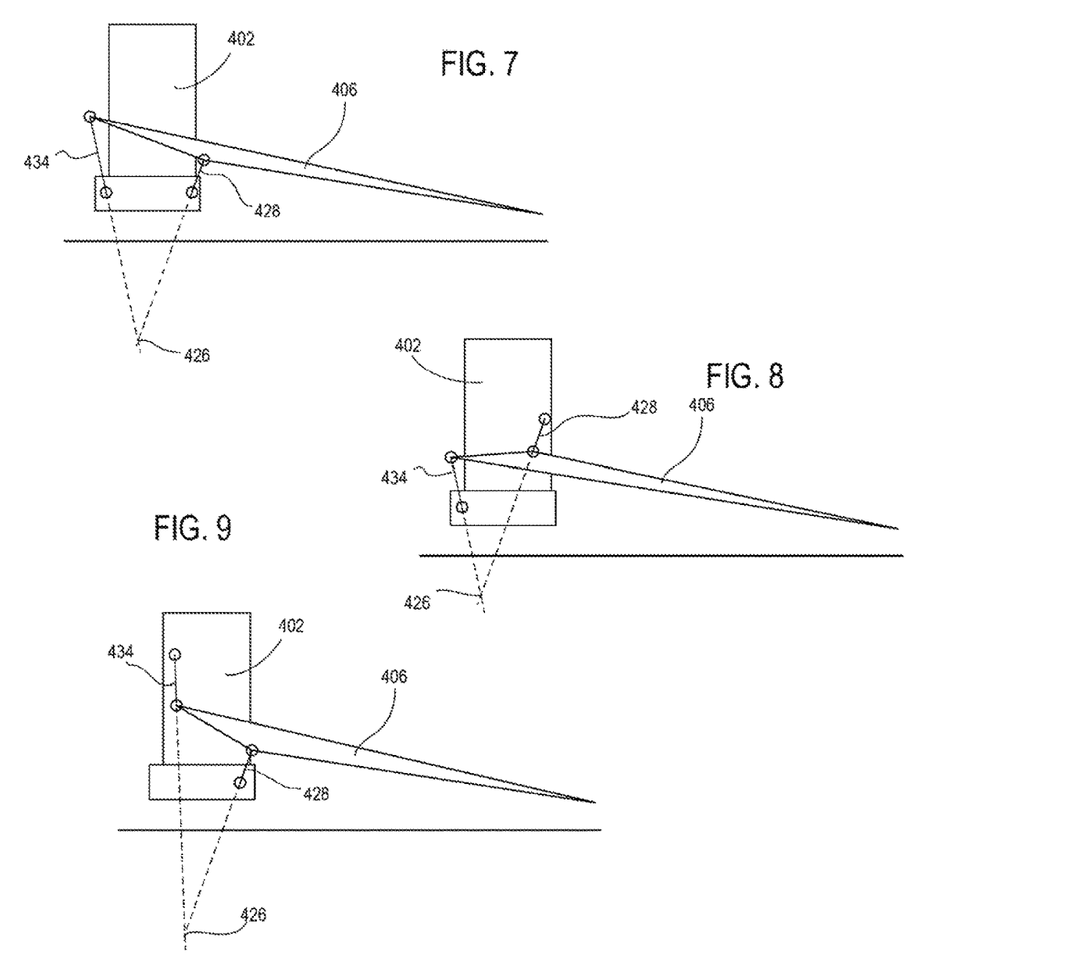
FIG. 7 is a schematic diagram of another exemplary embodiment of a cutter bar support linkage.
FIG. 8 is a schematic diagram of another exemplary embodiment of a cutter bar support linkage.
FIG. 9 is a schematic diagram of another exemplary embodiment of a cutter bar support linkage.

Referring now to FIGS. 7-9, a four-bar linkage may have various different linkage configurations. In FIG. 7, the support arm 406 is located above the front link 428 and the rear link 434. More specifically, the proximal front pivot 430 is below the distal front pivot 432, and the proximal rear pivot 436 is below the distal rear pivot 438. In FIG. 8, the front link 428 is above the support arm 406, and the rear link 434 is below the support arm 406. More specifically, the proximal front pivot 430 is located above the distal front pivot 432, and the proximal rear pivot 436 is located below the distal rear pivot. In FIG. 9, the front link 428 is below the support arm 406, and the rear link 434 is above the support arm 406. More specifically, the proximal front pivot 430 is located below the distal front pivot 432 and the proximal rear pivot 436 is located above the distal rear pivot 438. In each case, the pivots are configured to orient the links along respective lines that intersect below the linkage 424, and more preferably below the ground G.

Figure 10:
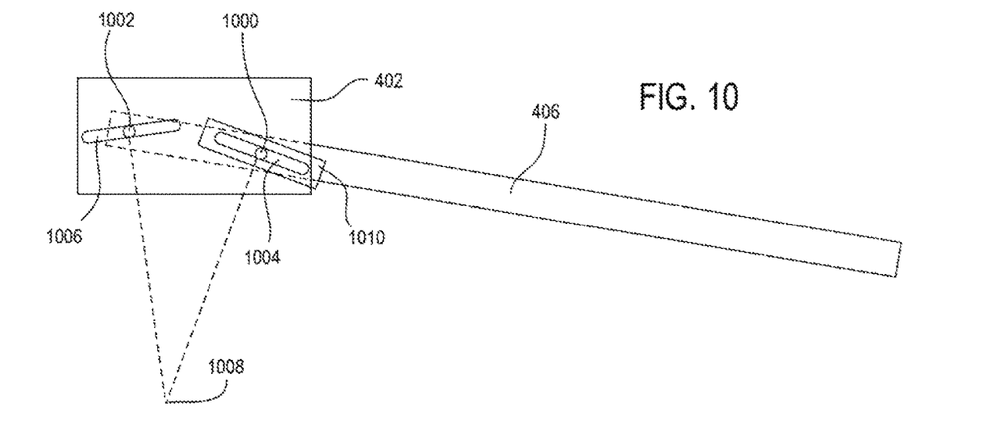
FIG. 10 is a schematic diagram of another exemplary embodiment of a cutter bar support linkage.
Figure 11:
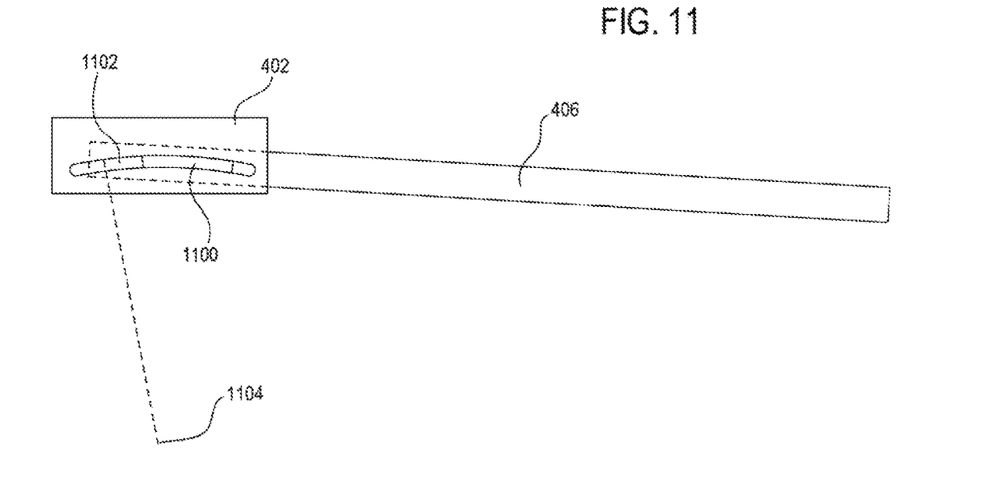
FIG. 11 is a schematic diagram of another exemplary embodiment of a cutter bar support linkage.

Referring now to FIGS. 10 and 11, other embodiments may use tracks and followers to achieve a virtual pivot located below the linkage and the ground level. For example, FIG. 10 shows a support arm 406 having a front roller pin 1000 and a rear roller pin 1002 that are spaced along the forward direction F, and the frame 402 includes a front track 1004 to receive the front roller pin 1000, and a rear track 1006 to receive the rear roller pin 1002. The front and rear tracks 1004, 1006 form pathways that control the motion of the respective roller pin 1000, 1002, and thus control the motion of the support arm 406. In this case, the front and rear tracks 1004, 1006 are linear paths that are angled relative to one another to cause the roller pins 1000, 1002 to move about a virtual pivot 1008 defined by lines extending perpendicular to the instantaneous point of contact between each roller pin 1000, 1002 and its respective track 1004, 1006. The location of the virtual pivot 1008 may be adjusted by changing the orientations of the tracks 1004, 1006. For example, one or both of the tracks 1004, 1006 may be formed on a plate 1010 that is rotatable relative to the frame 402.

FIG. 11 shows a support arm 402 having a semicircular slider 1100 that fits in a semicircular track 1102 on the frame 402. The slider 1100 is movable along the track 1102 to rotate the support arm 402. The semicircular track 1102 forms a virtual pivot 1104 located at the radial center of the semicircular track 1102.

In either of the foregoing embodiments, the positions of the track and the follower may be reversed (e.g., tracks on the support arm 406 and followers on the frame 402). Furthermore, the tracks and followers may comprise any suitable structure, such as roller bearings or low-friction sliders that fit into slots, opposed bearings that surround a plate-like track, and so on.

Figure 12:
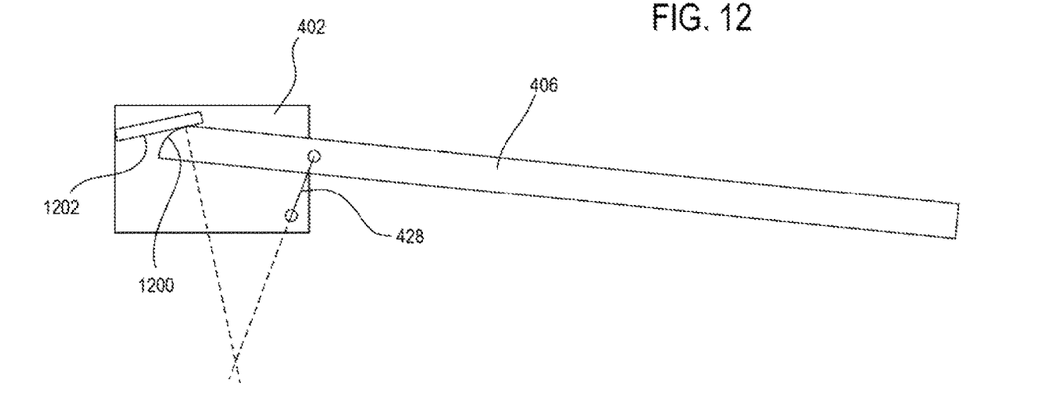
FIG. 12 is a schematic diagram of another exemplary embodiment of a cutter bar support linkage.

FIG. 12 shows another exemplary embodiment, in which a combination of a link and a cam and follower are used to control the motion of the support arm 406. In this case, a front link 428 connects the frame 402 to the support arm 406, and the rear of the support arm 406 is formed as a cam follower 1200 that slides along a cam surface 1202. The cam follower 1200 may comprise a rounded end of the support arm 406 or a separate part (e.g., a roller pin), and the cam surface 1202 may comprise a plate attached to the frame 402, or the like. The cam and follower arrangement also may be reversed, used with a rear link, and so on.

It will be appreciated that embodiments may include any combination of support arms and associated linkages. For example, a header may have a combination of assemblies as shown in FIGS. 4 through 12. One or more conventional support arms also may also be used in combination with one or more embodiments such as those described above. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle header comprising:
 a frame having a main truss extending in a lateral direction;
 at least one support arm extending from the frame in a forward direction;
 a cutter assembly attached to a respective distal end of each at least one support arm; and
 a linkage connecting a respective proximal end of each at least one support arm to the frame, the linkage comprising a virtual pivot located below the main truss, and behind the main truss in an operative position with respect to the forward direction.

2. The agricultural vehicle header of claim 1, wherein the linkage comprises:
 a front link extending in a first direction from a proximal front pivot on the frame to a distal front pivot on the support arm;
 a rear link extending in a second direction from a proximal rear pivot on the frame to a distal rear pivot on the support arm; and
 the first direction and the second direction intersect at a location below the linkage.

3. The agricultural vehicle header of claim 2, wherein, when the cutter assembly is located in an operative position with respect to an underlying horizontal surface, the first direction and the second direction intersect at a location below the underlying horizontal surface.

4. The agricultural vehicle header of claim 2, wherein the proximal rear pivot is located behind the main truss with respect to the forward direction.

5. The agricultural vehicle header of claim 2, wherein the proximal rear pivot is located on a rear side of the main truss, and the proximal front pivot is located on a front side of the main truss.

6. The agricultural vehicle header of claim 2, wherein the proximal front pivot is located behind the main truss with respect to the forward direction.

7. The agricultural vehicle header of claim 2, further comprising a suspension located between the front link and the rear link.

8. The agricultural vehicle header of claim 7, wherein the suspension comprises one or more mechanical or pneumatic springs.

9. The agricultural vehicle header of claim 7, wherein the suspension comprises a hydraulic actuator.

10. The agricultural vehicle header of claim 9, wherein the hydraulic actuator comprises:
 a first end connected to the proximal front pivot and a second end connected to the distal rear pivot; or
 a first end connected to the distal front pivot and a second end connected to the proximal rear pivot.

11. The agricultural vehicle header of claim 2, wherein, when the cutter assembly is located in an operative position with respect to an underlying horizontal surface, the distal front pivot and the distal rear pivot are located on a first line extending at 30 degrees or less relative to the underlying horizontal surface.

12. The agricultural vehicle header of claim 11, wherein, when the cutter assembly is located in an operative position with respect to an underlying horizontal surface, the proximal front pivot and the distal front pivot are located on a second line extending at 60 degrees or more relative to the underlying horizontal surface.

13. The agricultural vehicle header of claim 12, wherein, when the cutter assembly is located in an operative position with respect to an underlying horizontal surface, the proximal rear pivot and the distal rear pivot are located on a third line extending at 60 degrees or more relative to the underlying horizontal surface.

14. The agricultural vehicle header of claim 2, wherein, when the cutter assembly is located in an operative position with respect to an underlying horizontal surface:
the distal front pivot and the distal rear pivot are located on a first line;
the distal front pivot and the proximal front pivot are located on a second line oriented at less than 135 degrees to the first line; and
the distal rear pivot and the proximal rear pivot are located on a third line oriented at less than 135 degrees to the first line.

15. The agricultural vehicle header of claim 2, wherein, when the cutter assembly is located in an operative position with respect to an underlying horizontal surface, the proximal front pivot is located in front of the distal front pivot with respect to the forward direction, and the proximal rear pivot is located behind the distal rear pivot with respect to the forward direction.

16. The agricultural vehicle header of claim 2, wherein the proximal front pivot is located below the distal front pivot, and the proximal rear pivot is located below the distal rear pivot.

17. The agricultural vehicle header of claim 2, wherein:
the proximal front pivot is located below the distal front pivot and the proximal rear pivot is located above the distal rear pivot; or
the proximal front pivot is located above the distal front pivot and the proximal rear pivot is located below the distal rear pivot.

18. The agricultural vehicle header of claim 1, wherein the linkage comprises one or more tracks on one of the frame and the support arm, and one or more followers configured to slide in the one or more tracks on the other of the frame and the support arm.

19. The agricultural vehicle header of claim 1, wherein the linkage comprises:
a link extending from a proximal pivot at the frame to a distal pivot at the support arm;
a cam located on one of the frame and the support arm; and
a cam follower located on the other of the frame and the support arm.

20. The agricultural vehicle header of claim 1, further comprising a lateral conveyor located above the at least one support arm, and a backsheet located at a rear edge of the lateral conveyor and attached to the frame in front of the main truss.

21. An agricultural vehicle comprising:
a chassis configured for movement on a surface;
a header attached to the chassis, the header comprising:
a frame having a main truss extending in a lateral direction;
at least one support arm extending from the frame in a forward direction;
a cutter assembly attached to a respective distal end of each at least one support arm; and
a linkage connecting a respective proximal end of each at least one support arm to the frame, the linkage comprising a virtual pivot located below the main truss, and behind the main truss in an operative position with respect to the forward direction.

22. The agricultural vehicle header of claim 1, wherein as the linkage moves, the location of the virtual pivot remains below ground level.

* * * * *